United States Patent
Seidl et al.

(10) Patent No.: US 7,734,722 B2
(45) Date of Patent: Jun. 8, 2010

(54) DEEP CLICKFLOW TRACKING

(75) Inventors: Robert Seidl, Portola Valley, CA (US); Khai Doan, Milpitas, CA (US); David R. Thompson, San Francisco, CA (US)

(73) Assignee: Genius.com Incorporated, San Mateo, CA (US)

( * ) Notice: Subject to any disclaimer, the term of this patent is extended or adjusted under 35 U.S.C. 154(b) by 435 days.

(21) Appl. No.: 11/417,949

(22) Filed: May 3, 2006

(65) Prior Publication Data

US 2007/0011340 A1    Jan. 11, 2007

Related U.S. Application Data

(60) Provisional application No. 60/687,597, filed on Jun. 2, 2005.

(51) Int. Cl.
*G01R 31/28* (2006.01)
*G06F 15/16* (2006.01)

(52) U.S. Cl. .......................................... 709/218; 714/38
(58) Field of Classification Search ................. 709/218; 714/38
See application file for complete search history.

(56) References Cited

U.S. PATENT DOCUMENTS

| | | | |
|---|---|---|---|
| 5,550,971 A | | 8/1996 | Brunner et al. |
| 5,708,780 A | * | 1/1998 | Levergood et al. .......... 709/229 |
| 5,721,901 A | | 2/1998 | Banning et al. |
| 5,920,856 A | | 7/1999 | Syeda-Mahmood |
| 5,935,207 A | * | 8/1999 | Logue et al. ................. 709/219 |
| 6,029,141 A | * | 2/2000 | Bezos et al. ................... 705/27 |
| 6,044,398 A | * | 3/2000 | Marullo et al. ............... 709/219 |
| 6,052,730 A | * | 4/2000 | Felciano et al. ............. 709/225 |
| 6,185,701 B1 | * | 2/2001 | Marullo et al. ............... 709/219 |
| 6,345,292 B1 | * | 2/2002 | Daugherty et al. .......... 709/214 |
| 6,598,051 B1 | * | 7/2003 | Wiener et al. ................ 707/100 |
| 7,043,555 B1 | * | 5/2006 | McClain et al. ............. 709/229 |
| 7,054,858 B2 | | 5/2006 | Sutherland |

(Continued)

FOREIGN PATENT DOCUMENTS

EP    0926614    6/1999

(Continued)

OTHER PUBLICATIONS

Baeza-Yates, R.; Castillo, C., "Relating web characteristics with link based web page ranking," String Processing and Information Retrieval, 2001. SPIRE 2001. Proceedings.Eighth International Symposium on , vol., No., pp. 21-32, Nov. 13-15, 2001.*

(Continued)

*Primary Examiner*—Ajay Bhatia
(74) *Attorney, Agent, or Firm*—Blakely, Sokoloff, Taylor & Zafman LLP

(57) ABSTRACT

A system and method is disclosed herein for obtaining information from web site use. In one embodiment, the method comprises tracking interactions of a user with web content when the user uses a modified link to enter a website. The modified link is a link in a format that resembles a website address for the website but resolves at a location through which the user's interactions can be tracked. The method also includes storing data indicative of tracked interactions in a database.

27 Claims, 7 Drawing Sheets

U.S. PATENT DOCUMENTS

| | | | |
|---|---|---|---|
| 7,072,947 B1 | 7/2006 | Knox et al. | |
| 7,076,533 B1 | 7/2006 | Knox et al. | |
| 7,120,590 B1 | 10/2006 | Eisen et al. | |
| 7,127,608 B2 * | 10/2006 | Royer et al. | 713/162 |
| 2002/0010757 A1 * | 1/2002 | Granik et al. | 709/218 |
| 2002/0128908 A1 | 9/2002 | Levin et al. | |
| 2003/0225834 A1 | 12/2003 | Lee et al. | |
| 2004/0117486 A1 * | 6/2004 | Bourne et al. | 709/228 |
| 2005/0010557 A1 | 1/2005 | Dettinger et al. | |
| 2005/0038900 A1 | 2/2005 | Krassner et al. | |
| 2005/0044101 A1 | 2/2005 | Prasad et al. | |
| 2005/0102271 A1 | 5/2005 | Robertson | |
| 2005/0222981 A1 | 10/2005 | Lawrence et al. | |
| 2005/0256908 A1 | 11/2005 | Yang et al. | |
| 2006/0041550 A1 | 2/2006 | Bennett et al. | |
| 2006/0059238 A1 | 3/2006 | Slater et al. | |
| 2006/0212362 A1 | 9/2006 | Donsbach et al. | |
| 2006/0288220 A1 * | 12/2006 | Pennington et al. | 713/176 |

FOREIGN PATENT DOCUMENTS

| | | |
|---|---|---|
| WO | WO 00/41118 | 7/2000 |
| WO | WO 01/41002 | 6/2001 |
| WO | WO 2005/006216 | 1/2005 |

OTHER PUBLICATIONS

International Search Report and Written Opinion of the International Searching Authority, European Patent Office, Application No. PCT/US2006/020604 mailed Oct. 25, 2006.

PCT Preliminary Report on Patentability, PCT/US2006/020603 issued Dec. 6, 2007.

PCT Written Opinion of the International Searching Authority, PCT/US2006/020603 issued Dec. 6, 2007.

International Search Report and Written Opinion of the International Searching Authority, European Patent Office, Application No. PCT/US2006/020603 mailed Nov. 20, 2006.

Office Action dated Apr. 25, 2008, U.S. Appl. No. 11/417,948; filed May 3, 2006.

Final Office Action dated Oct. 28, 2008, U.S. Appl. No. 11/417,948; filed May 3, 2006.

Office Action dated Mar. 25, 2009, U.S. Appl. No. 11/417,948; filed May 3, 2006.

PCT International Search Report for PCT Application No. PCT/US2006/020857, dated Jun. 20, 2008, 2 pages.

Written Opinion of The International Searching Authority for PCT Application No. PCT/US2006/020857, dated Jun. 20, 2008, 5 pages.

* cited by examiner

US 7,734,722 B2

DEEP CLICKFLOW TRACKING

PRIORITY

The present patent application claims the benefit of U.S. provisional patent application No. 60/687,597 filed on Jun. 2, 2005, titled "Deep Clickflow Tracking" and hereby incorporates it by reference.

RELATED APPLICATIONS

This application is related to the applications entitled Real-Time Data Architecture, concurrently filed on May 3, 2006, U.S. patent application Ser. No. 11/418,416; Database Query Construction and Handling, concurrently filed on May 3, 2006, U.S. patent application Ser, No. 11/417,948.

FIELD OF THE INVENTION

The present invention relates to the field of marketing information support systems; more particularly, the present invention relates to tracking interactions of a user with web content when the user uses a modified link to enter a website.

BACKGROUND OF THE INVENTION

The internet continues to expand as a source of information gathering and information distribution. Businesses increasingly market, sell, support, and offer information about products to potential customers via the internet. To provide support to such companies approaches have been developed which provide information about how web sites are used by visitors/potential customers. How a business's web site is viewed by visitors can provide important marketing information. When a visitor, or potential prospect, enters a web site of a business, the business both knows the visitor is interested in the business, product, or service, and a point of contact with the potential customer is established.

One prior approach for acquiring marketing information from web site use was to utilize information from web servers. To obtain relevant data, however, software was either required to be installed at a web server, software and/or hardware was required to have access to the web server, or instrumentation code was required to be embedded in a company's web page. Each approach was far from ideal. In order for the above approaches to be implemented, significant time, money, and personnel are required to both install and debug such systems. Further, the approaches require constant maintenance and monitoring which can severely impact both the reliability and efficiency of the web server.

A less intrusive, but also less informative, approach to supplying information about the use of a web site by a visitor, is referred to as "entrance tracking." Entrance tracking captures a first click, or entrance, to a web site and keeps track of the number of first clicks. For example, Google offers AdWords, which is a pay-per-click advertisement system. To implement entrance tracking under AdWords, when a link is created for a Google advertisement, a unique identifier is attached to the link. When the link is selected, a web server records the selection along with the unique identifier before immediately redirecting the visitor/customer to the target website. Because the approach only records the first click, it fails to provide valuable information about how a website is used by a potential customer.

Therefore, using the approaches described above, companies are not afforded a full picture of how their web site is being used by potential customers, nor do they realize valuable marketing information, which can be acquired directly from a point of contact with an interested potential customer.

SUMMARY OF THE INVENTION

A system and method is disclosed herein for obtaining information from web site use. In one embodiment, the method comprises tracking interactions of a user with web content when the user uses a modified link to enter a website, where the modified link is in a format that resembles a website address for the website but resolves at a location through which the interactions can be tracked. The method also includes storing data indicative of the tracked interactions in a database.

Other features and advantages of the present invention will be apparent from the accompanying drawings and from the detailed description that follows below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
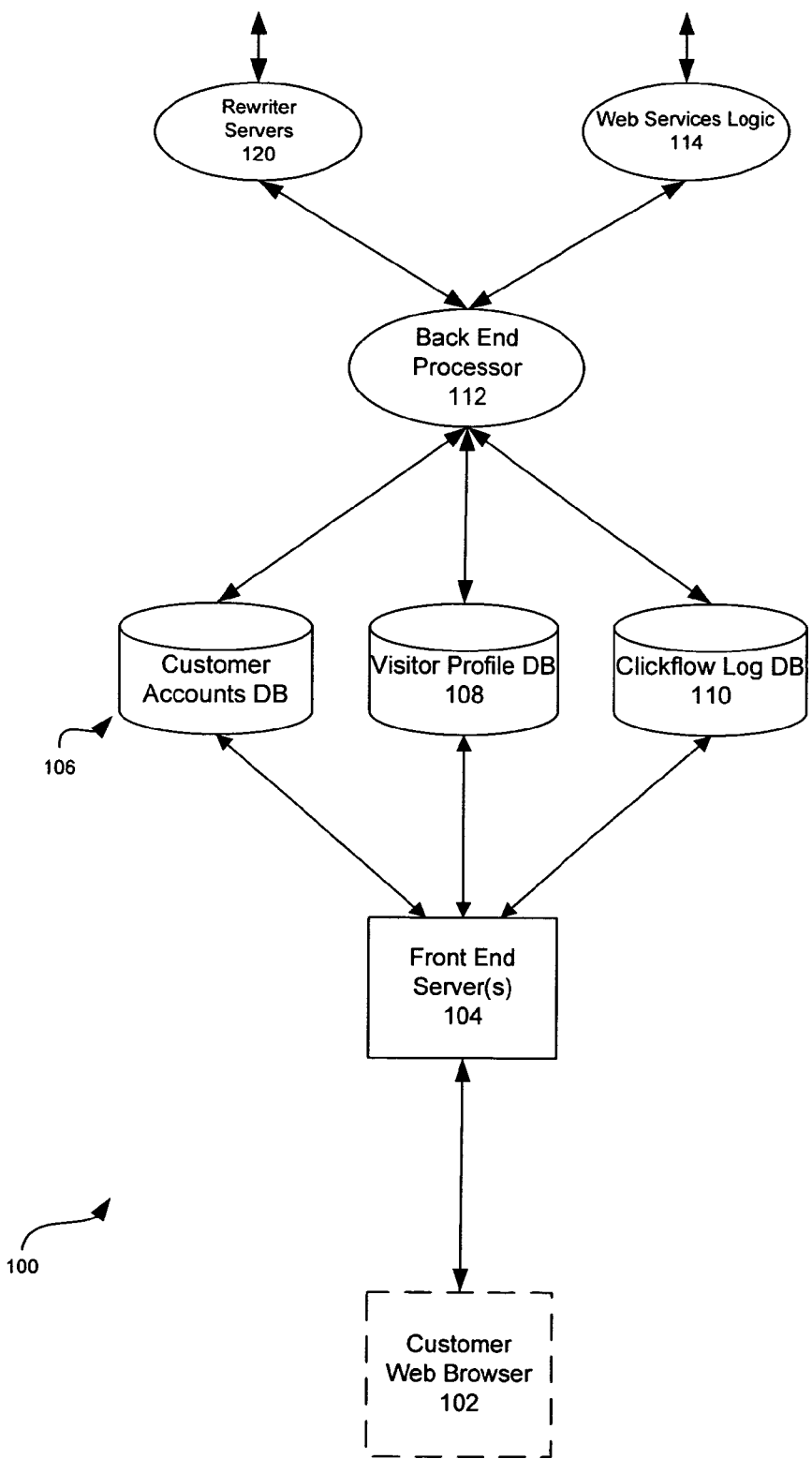
FIG. 1 illustrates one embodiment of a system for deep clickflow tracking.

An apparatus for deep clickflow tracking and a method for using the same are described. The method includes capturing data relevant to marketing professionals generated by user interactions with a web site without requiring additional instrumentation to the web server or web pages. In one embodiment, interactions of a user with web content are tracked when the user uses a modified link to enter a website. Although the link is in a format that resembles a Universal Resource Locator (URL) link to the website, the link resolves at a location through which the user's interactions with web content can be tracked. Data indicative of the tracked user interactions is stored in a database In one embodiment, an original URL is received. The original URL is an address for web content on the Internet. In order to track user interactions with the web content, URL links are modified to resemble the original URLs for the web content but to resolve at a location where user interactions can be tracked. In one embodiment, the location is a tracking server. In response to a user selecting a modified link, web content corresponding to the modified link is obtained and data indicative of the interaction is stored in a database. Because the obtained web content may also contain links to one or more web content objects, the one or more links are replaced with modified link. Use of these modified links will further be recorded and web content with modified links will be supplied to the user. As a result, a full view of user interactions with a website can be continuously tracked. In one embodiment, links which permit the tracking of user interactions with web content can be included in an email, recited in a voicemail, written in a direct mailing, etc.

A vital aspect of tracking user interactions with web content is to preserve the integrity of the user's experience with web content. When a user accesses web content, the web browser being used by the user will include request parameters. Such parameters may include, for example, browser type. Therefore, upon receiving a request from a user for web content, header information relevant to the web browser type used by the user is forwarded with the request for content. As a result, web content appropriate for the user's browser type can be obtained and supplied to the user. The user's experience with the web content, therefore appears and functions as if the content had not been modified.

In one embodiment, user interactions with modified content are recorded to a database, the recorded information provides comprehensive data regarding how a user interacts with a web site. The data can indicate, for example, the sequence of pages within the customer's website traversed by the user, length of visit, presence on a website, etc. Further, modified links can be personalized to track information pertaining to individual users, all users connected with a specific product or service, or any other desired grouping that may be valuable to a marketing professional.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram providing an overview of a system for implementing deep clickflow tracking. Front end server(s) 104 receive URLs from customer web browser 102. The URLs provide addresses for web content, where user interactions with the web content will be tracked. Front end server(s) may be a single server or multiple servers. Further, front end server(s) may be located directly within the company's infrastructure or remotely. In either configuration front end server(s) are in contact with the databases 106-108.

Customer web browser 102 is displayed in dashed lines to indicate that it is not part of the deep clickflow tracking system, but rather provides communication capabilities with the system in order to receive transmission of information necessary to initiate deep clickflow tracking. Front end server(s) 104 communicate with customer web browser 102 using standard Hyper Text Transfer Protocol (HTTP) protocols. Any form of communication could be utilized to receive a URL, or an indication of the URL, to be tracked.

Upon being contacted, the front end server(s) 104 receive customer account information which is recorded to customer account database 106. In one embodiment, customer account database 106 stores, among other items, customer URLs that will be modified, customer contact information, customer names, customer addresses, modified URLs, etc. Customer accounts database 106 can be configured to store any information relevant to the customer and/or useful to administering deep clickflow tracking for the customer.

Back end processor 112 then modifies a customer URL, as discussed in greater detail below, and stores the modified URL in one or all of the company databases 106-110. The modified URLs are later utilized by the back end processor 112 in recording clickflow data of associated with a user within the relevant sections of the clickflow log database 110, visitor profile database 108, and/or customer accounts database 106.

In one embodiment, the modified URL is then transmitted by the front end server(s) 104 to the customer web browser 102. The modified URL is transmitted using standard HTTP protocols so that it can be received in any HTTP compliant web browser utilized by an invitee. In one embodiment, the modified URL is referred to as a GURL, where Genius is the company that provides deep clickflow tracking services to customers. As will be discussed in greater detail below, the modified URL, or GURL, is modified to resemble the customer's URL, but to resolve at a location through which the interactions of a user can be tracked. In one embodiment, the modified link resolves at an address for rewriter servers 120.

Rewriter servers 120 receive data indicative of a user's selection of a modified link. In one embodiment, the link may itself supply a key into the relevant portions of the databases 106-110 used by the back end processor 112 to record link selection. In another embodiment, the link facilitates a lookup by back end processor 112 before link selection can be recorded in one or more of the company databases 106-110.

Web services may also be supplied by web services logic 114 in connection with the rewriting servers 120 and/or the deep clickflow tracking. Web services logic 114 may be used to support customer adverting web services or to provide a customer with new or additional advertising web services. In one embodiment, the advertising web services supplied by web services logic 114 include, for example, cost-per-click (CPC) processing associated with advertisements, monitoring keywords associated with an advertisement, impression recordation, etc.

Web services logic 114 may also provide customer resource management (CRM) web services. The CRM web services would users and customers. The CRM web services could monitor and/or provide customers with contact information for users, sales information, monetary amounts, etc. Further, in one embodiment, the CRM services may be provided to customers independent of modified links. Thus, in one embodiment, the CRM services provided by web services logic 112 support ongoing business activities.

In one embodiment, web services logic 114 may also provide e-mail support services. Such e-mail support services may include sending notifications whenever a modified link has been selected, user presence on a website is detected, a database has been update, etc. The e-mail support services may further support update notifications in Short Message Service (SMS) form so that update notifications may be distributed over wireless networks. One skilled in the art will recognize the various channels of distributing update notifications.

Although specific examples have been discussed above with respect to web services logic, any number of services, notifications and associated conditions relevant to advertising, marketing, CRM services, email services, etc. can be provided as will be apparent to those skilled in the art.

Figure 2:
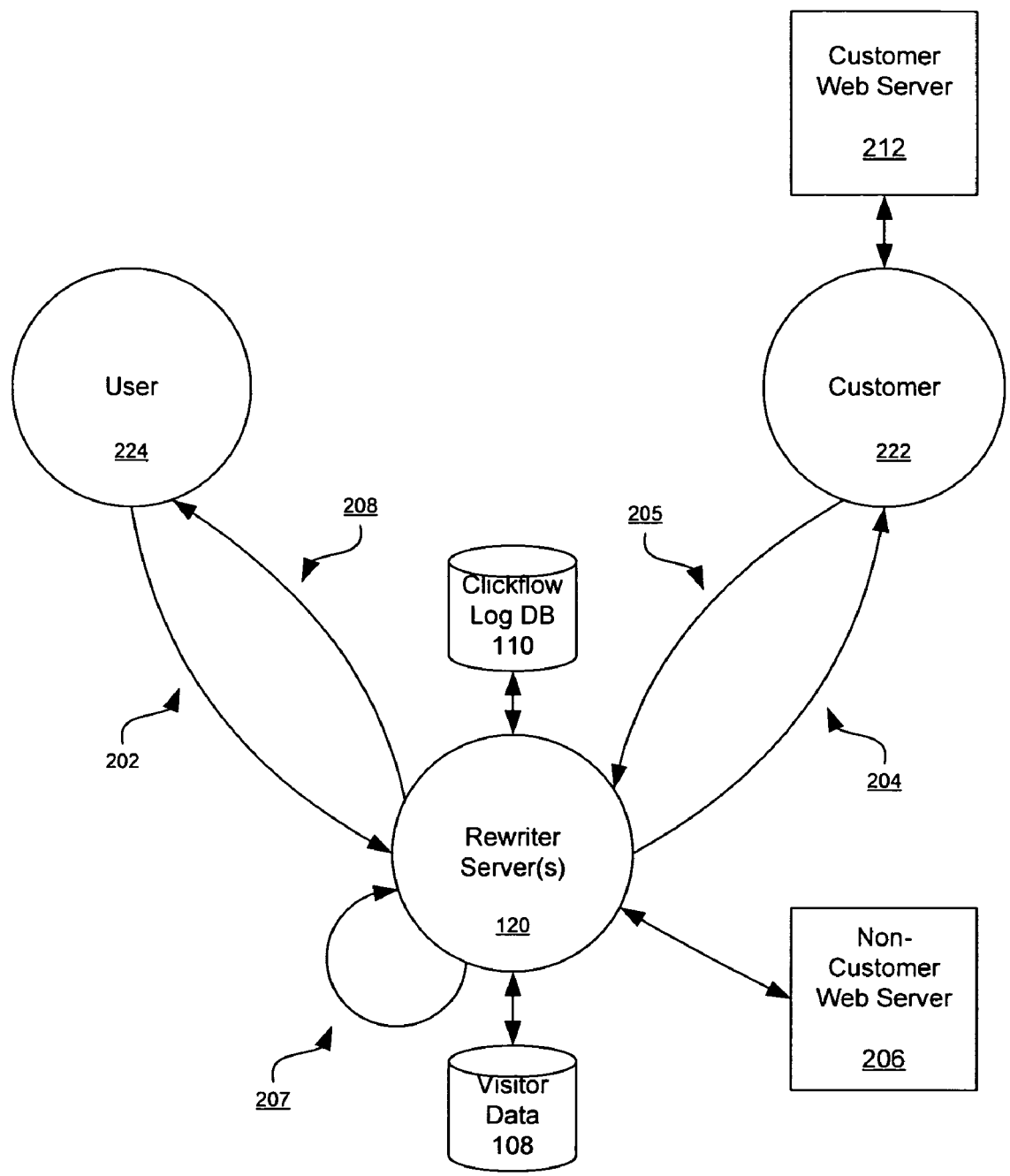
FIG. 2 illustrates one embodiment of a deep clickflow tracking process.

FIG. 2 is a block diagram of one embodiment for a deep clickflow tracking process. Upon a user 224 using a modified link 202, as discussed in greater detail below, the link resolves at a location where user interaction with web content can be tracked. Such web content may be web content of a customer. In one embodiment, the modified link resolves at company rewriter server(s) 120.

In one embodiment, the link is modified to include data which is either a key to, or facilitates the acquisition of, user/visitor data and customer data associated with the link. In one embodiment, the customer data includes any or all of the an original customer URL, customer information, information relating to an advertisement campaign of the customer, user identifiers, etc. Customer data is acquired 216 by the back end processor (not shown) from the customer accounts database (not shown) while visitor data associated with a user is acquired 216 from the visitor profile database 108. Rewriter server(s) 120 also record the modified link selection as well as other data pertaining to user interactions with web content that is relevant to clickflow tracking.

In another embodiment, the customer and user/visitor information is stored in a cookie rather than in encoded in the form of a modified link. The cookie contents are served back to rewriter server 120 with every request for a web page so that the requested information can be reassembled by rewriter server 120. Advantageously, the use of cookies for non-URL information allows for modified links that appear more like original URL links with just the domain having been changed.

In one embodiment, a record of clickflow relevant data is written to clickflow log database 110. In one embodiment, relevant clickflow data recorded to the database includes requested URL, referrer, host Internet Protocol (IP) address, cookies, time on page, time on site, presence, visitor ID, campaign ID, customer ID, etc. One skilled in the art will recognize that more or less data, according to the requirements of a customer can be recorded.

From the data obtained by rewriter server(s) 120, the original URL associated with the modified link is used to request web content 204 from customer web server 212. Rewriter servers receive the requested web content 205. Because not all requested content may be located on customer web server 212, rewriter server(s) 120 further request content objects from non-customer web servers 206. Thus, rewriter server requests and receives all web content necessary to supply the user with the requested web content.

In one embodiment, rewriter server(s) then modifies/rewrites 207 links within the received web content into modified links. In one embodiment, only source content which contains links, i.e., URLs, is rewritten. Because web pages continue to include bandwidth intensive content, such as images, sounds, movies, animations, etc. rewriter server(s) 120 provide such bandwidth intensive content objects to user 224 directly from the customer's web server 212 or non-customer web server 206, rather than through the rewriter server(s) 120. In another embodiment, only links that refer back to the customer's web server are rewritten because tracking users outside the customer's domain is unnecessary. Furthermore, rewriting content and dynamically injecting content into web content beyond customer's domain can impact the rights of third parties.

Thus, each link included in the web content served 208 to user 224 is also a modified link. Because all links are now modified links, in response to any one of them being used, clicked, or selected, control will again return to rewriter server(s) 120. The rewriting process repeats for the newly requested page, which results in continued tracking of the user's clickflow while the user remains on the web site.

In one embodiment absolute URLs and relative URLs are handled differently, Absolute URLs are URLs which contain a path to the file represented by the link, whereas relative URLs are URLs that include a path to content in relationship to the current path. In one embodiment, absolute URLs are rewritten while relative URLs are not in order to reduce the amount of HTML supplied to a user while minimizing the rewriting performed by rewriter server 120.

Additionally, rewriter server 120 will, if possible, attempt to deposit a user-cookie specific cookie with user 224 when web content is provided to the user. The cookie is a small file deposited into the user's computer (not shown) that will serve to uniquely identify the user during future visits to the customer's web site. However, depositing the cookie will allow tracking of user 224 even if the user returns to tracked web content via a non-modified link.

For example, rewriter server 120 may be configured to track clickflow data associated with users that request web content through a banner advertisement. If rewriter server 120 has successfully deposited a cookie with user 224, rewriter servers 120 can track the user's interactions with the web content. Although the banner add might provide a category that is being tracked (i.e., all clickflow data associated with users that request customer web content via the banner advertisements), the cookie would also inform rewriter server(s) 120 of the specific identify of the user 224.

In one embodiment, content is further dynamically injected 207 into web content before the content is served 208 to a user. Content may be injected into content with the permission and/or at the direction of the customer. Further, rewriter server 120 can be configured to automatically inject content into web content when predetermined conditions have been satisfied. For example, logic within company rewriter server 120 may determine that a specific user has viewed a web page related to troubleshooting a product of the customer on numerous occasions. Upon determining this, rewriter server 120 could then dynamically inject a chat function with customer support services, a "yellow sticky note" offering help with the user's perceived issues, etc. In one embodiment, JavaScript (or other scripting) content is dynamically injected into a web page to record the details of browsing behavior on a web page, such as mouse movements, amount of scrolling, text data entry including deletions, etc. Such information is very useful information to web page designers who want to make their sites more user friendly, effective to navigate, efficient, etc. One skilled in the art will recognize the numerous conditions and occasions when content could be dynamically injected into web content.

Advantageously, company rewriter server supplies the user with a good user experience. The experience is considered good because the web content provided to the user appear like the originally requested web content. Thus, the user is not impacted by the rewriting process. Further, and more importantly, the web content functions the same as the original web page.

Furthermore, the rewriter does not require installation of software or hardware on a customer's web site or customer web server. Thus, the services of information technology professionals are not needed to implement the rewriting services and deep clickflow tracking. Additionally, no maintenance time is required of the customer, and minimal man hours are spent setting up and interacting with the system. However, in another embodiment, the rewriter could reside at a customer location so that the rewriting server could be in direct communication with the customer web server. In yet another embodiment, the rewriting services can be implemented within the web server so that no additional equipment, beyond the customer's original web server is required.

In one embodiment, the rewriting process is a hybrid of server based rewriting, as previously described, and script (e.g., JavaScript, Prehypertext Processing script, etc.) based rewriting inside a web browser. By combining server based and script based rewriting, dynamic web content, such as dynamically created menu system, is also modified fo the purpose of clickflow tracking.

In another embodiment, deep clickflow tracking is not initiated with the selection of a modified link. Instead, a single (or some small number of) entry pages contain a script. These entry pages initiate the deep tracking process by redirecting requests for web content to rewriter server(s) 120, after which the deep clickflow tracking process continues as described above. An advantage of embedding scripts in one or more entry pages is that all visitors (including anonymous/previously unknown web site visitors) can be tracked by rewriting server(s) 120. Furthermore, a modified link is not required for the initial entry pages as an entry page may be typed, bookmarked, found via a search engine etc. Thus, with minimal content change effort, web pages become highly trackable.

In yet another embodiment, a script (different from the entry page described above) is provided to the owner of web content to be placed in every one of the owner's web pages. Upon vistor/user entry into a web page, the script reports access from a web browser to rewriter server(s) 120 using asynchronous data transfer after the requested web page is finished loading. As such, a visitor/user is tracked upon selection of an original URL link, as modified links not necessary under the current embodiment. Furthermore, any incoming visitor/user for a web site with the embedded script is tracked, not just those requesting web content via modified links.

In one embodiment, in order to obtain more detailed and/or comprehensive clickflow tacking data, one or more of the techniques described above are simultaneously employed. Thus, various forms of visitors/users interactions with web content are tracked, including return visitors/users, previously identified as well as new "anonymous" visitors/users, visitor/users that request web content via a modified link, visitors/users that request web content form an entry page with an embedded script, etc.

Figure 3A:
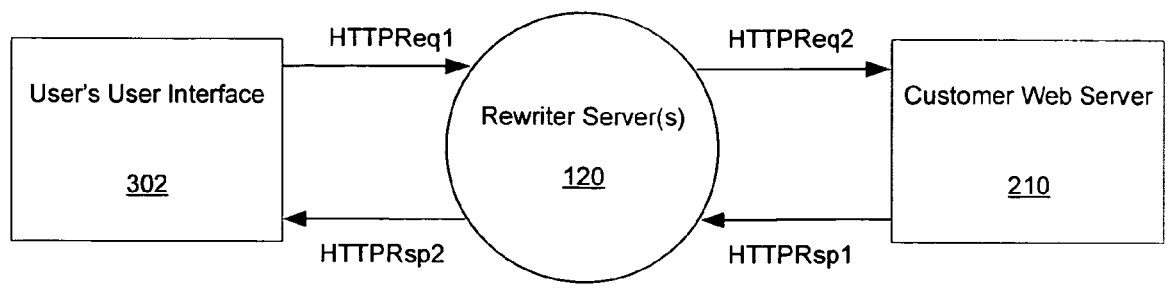
FIG. 3A illustrates one embodiment of supplying modified web content.
Figure 3B:
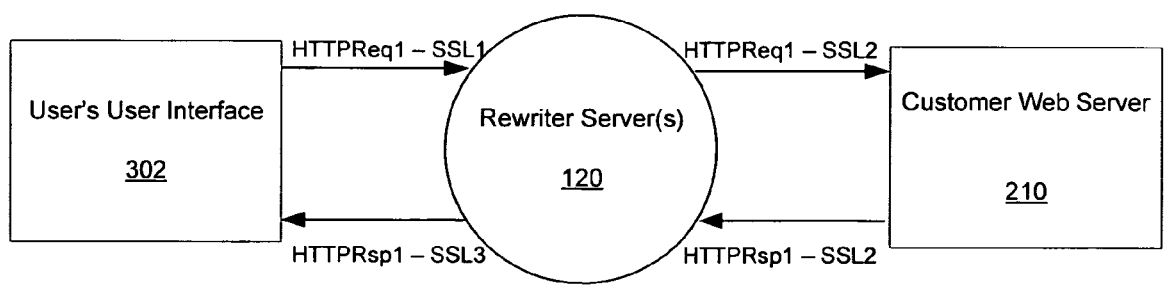
FIG. 3B illustrates another embodiment of supplying modified web content.

In order to provide a good user experience for user, web content should appear and act as if it is served directly from customer web server 210. FIGS. 3A and 3B are block diagrams which illustrate how web content served from a rewriting server preserves the functionality and appearance of a web content.

FIG. 3A illustrates one embodiment of standard HTTP request and response operations administered by rewriting server(s) 120. As discussed above, when a modified link is selected it resolves at a location through which user interactions with web content can be tracked. In one embodiment, a modified link resolves at the rewriter server(s) 120. That is, rewriter server(s) 120 receive a request from a user 302 for web content associated with a modified link, HTTPReq1. In order to faithfully reproduce the look and feel of the user's experience, rewriting server(s) 120 request web content from the customer web server 210 by forwarding all relevant HTTPReq header information received from the user 302. HTTPReq2, therefore, forwards relevant user interface information, such as the user's useragent, user's browser type, cookie information, authentication parameters, etc. directly to the customer web server.

Rewriter server(s) 120 receives web content, including HTTPRsp 1 parameters, and includes them in the modified web content served the user 302. Therefore, the information relevant to a user interface being used by the user is utilized to both request and then to supply web content, including the modified links. As a result, the user's experience is preserved so that modified web content both acts and functions as if it were served directly from customer web server 210.

A complication arises because modern web pages have a variety of other forms of content that may contain links. For example, embedded JavaScript is rewritten using document.location.href and window.open, whereas links in HTML are written using document.write. Further, embedded Macromedia Flash content and Postscript Document Format (PDF) files are rewritten so that the links within the embedded Macromedia Flash and PDF content included modified links. One skilled in the art will recognize the various file formats that are present in modern web content, and which can be rewritten, in order to provide for comprehensive deep clickflow tracking.

FIG. 3B illustrates a special case of the HTTP Request and HTTP Response operations carried out by rewriting server(s) 120. The internet is now a source of private and secure content. As such, protocols have been developed for communicating secure information, such as credit card numbers or personal identification numbers, over the internet. One such protocol in wide use on the internet is the https communications protocol. The protocol utilizes site-specific digital certificates (SSL certificates), in addition to standard request and response protocols, to encrypt data communicated using SSL. Because the SSL certificates are site-specific, rewriter server(s) 120 cannot use a customer certificate in connection with modifying web content.

To overcome the noted obstacle, rewriter server(s) 120 utilize an SSL certificate SSL of the rewriter during secure protocol communications between the user 302 and rewriter server(s) 120. However, rewriter server(s) 120 utilize an SSL certificate of the customer during communications between the rewriter server(s) 120 and customer web server 212. As a result secure communications between the user and web content, despite being rewritten, are secure under the SSL protocol. The remaining flow of FIG. 3B is substantially the same as that discussed with respect to FIG. 3A. In one embodiment, if a web page is served using https, then all content contained in the page (images, flash, etc.) are served through rewriter server(s) 120 instead of directly, thus avoiding dialogs in the client browser warning of mixed content (secure/insecure). Thus, the technique would prevent the possibly disconcerting dialogs while preserving the experience the user would have had by visiting the original site directly.

Links may be modified, or transformed into Genius URLs (GURLs), by the system discussed in FIGS. 1-2 in various ways, according to embodiments of the present invention. The modified links (GURLs) are a special form of URL link, crafted on behalf of a customer to allow access to informative web content supplied by, or on behalf of, the customer. The modified link can be created from received URL. However, to preserve and protect third party rights, only URLs on customer owned or authorized websites, and not arbitrary 3$^{rd}$ party web sites may be rewritten. Furthermore, any URL can be used, as long as there is an existing page or file present on the customer's server associated with the URL.

The modified URL link is a rewritten form of the URL that points to rewriting server(s) (not shown), with a subdomain corresponding to a customer, allowing for cobranding. The actual target URL on the customer's webserver, and any additional tracking information is encoded into the modified URL. In one embodiment, a URL and tracking information are stored in a database. The tracking information is keyed to a database by a key that provides access to that record.

In one embodiment, checksum bits are added for tamper-proofing, error detection, and error correction. In the embodiment, a short alphanumeric representation of a bitstring is returned as the path element behind the servers host address. This short form of the modified link, without any special characters, is convenient for transmission over email as it is unlikely to be cut into pieces by email servers imposing a maximum number of characters per line or other gateway parsers tripping over long or complicated URLs. It can also be copy/pasted easily into other documents, printed/offline collateral, or transmitted by voice over the phone.

For example, the deep clickflow tracking system may receive an original URL that reads:

http://www.bvs.com/webinar/invite.php

In one embodiment, the initial modified link, which can either be sent out or stored in a database for later use and/or retrieval by the clickflow tracking system, would read (with minor syntactical changes ignored below for clarity of presentation):

http://bvs.rsvp1.com/url=http://www.bvs.com/webinar/invite.php&customerID=2883&activityID=28328&visitorID=23882

In one embodiment, the final form of the modified URL link, where "Ws28dDFW" is a key into a database record, would read:

http://bvs.rsvp1.com/Ws28dDFW

In another embodiment, the final form of the modified URL can be simplified to be more human-readable and memorable. Via an additional database lookup, the modified link can be written without the actual database key, resulting in fewer typos and better recall of modified links on direct mail pieces, television, radio, or any other form for distributing information. Thus, the link:

http://bvs.rsvp1.com/webinar_invite via a database lookup, would result in a record corresponding to, for example, the database record associated with the key "Ws28dDFW."

In one embodiment, links may be modified and tailored based on a general area of interest to a customer, such as links targeted at an advertisement for a television, a radio show, or a pledge drive, etc. For example, the modified links would read:

http://bvs.rsvp1.com/tv_offer
http://bvs.rsvp1.com/radio_program
http://bvs.rsvp1.com/pledgedrive2006

Furthermore, the deep clickflow tracking system links can individualize modified links for particular intended recipients, such as:

http://bvs.rsvp1.com/spring/hsimpson
http://bvs.rsvp1.com/spring/mburns
http://bvs.rsvp1.com/spring/nflanders In all cases, the "rsvp1" domain is an example domain owned by the company and "bvs" is an example subdomain corresponding to one customer. Browsers would resolve the modified link into an IP address of a machine (or cluster of machines) hosted by the company.

Figure 4A:
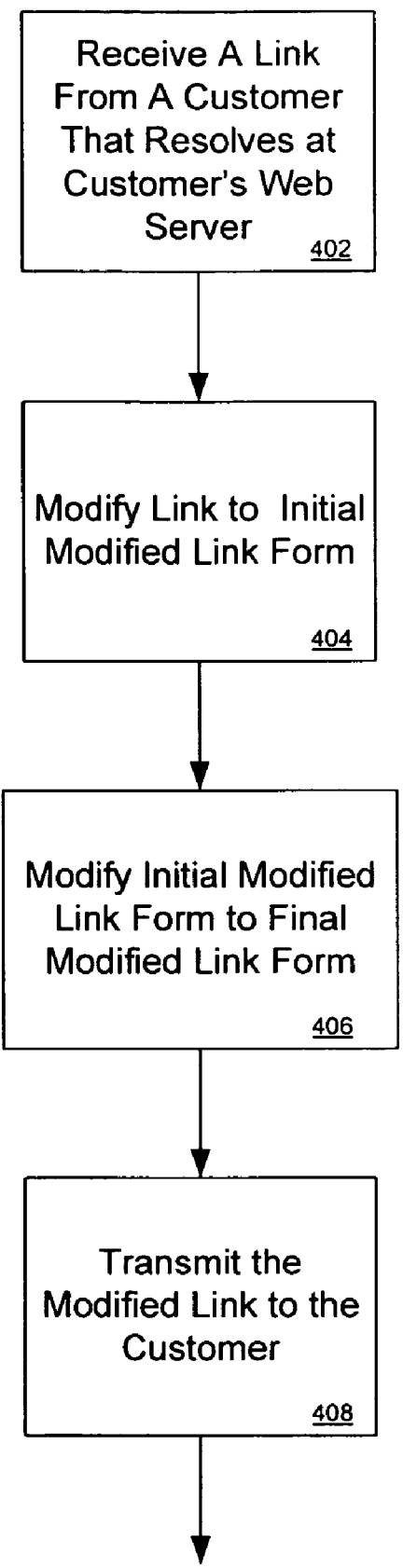
FIG. 4A is a flow diagram of one embodiment of a process for deep clickflow tracking.
Figure 4B:
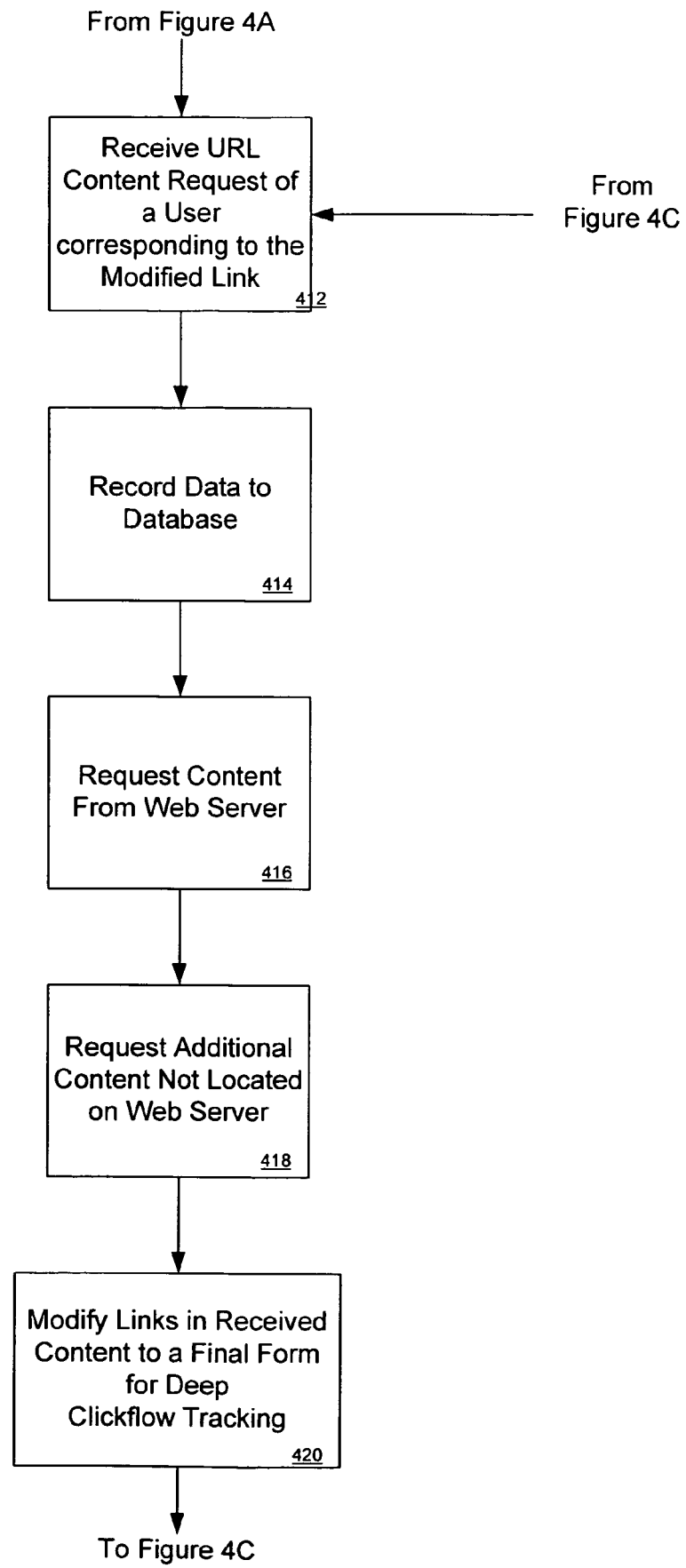
FIG. 4B is a flow diagram which continues the process of FIG. 4A.
Figure 4C:
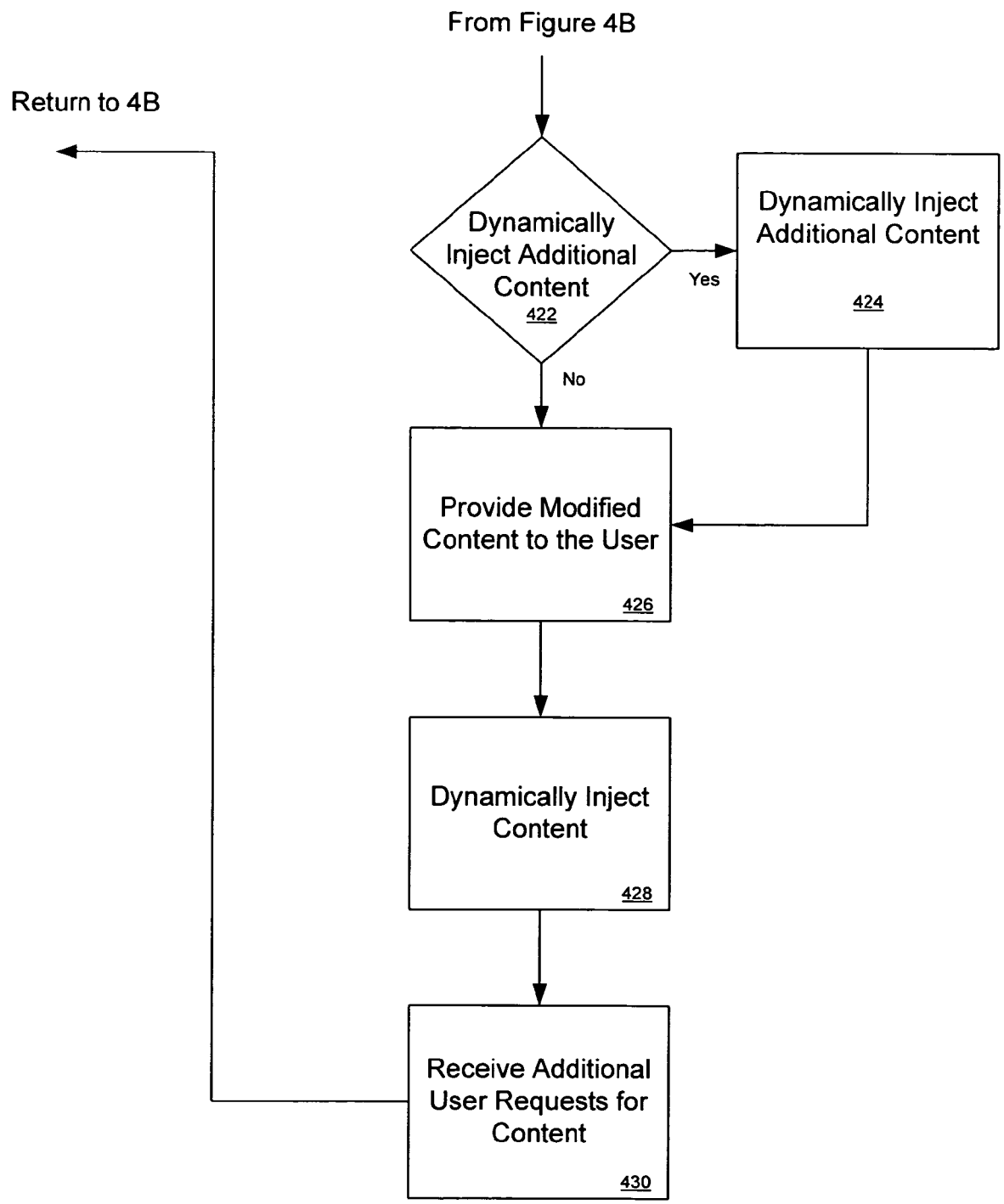
FIG. 4C is a flow diagram which continues the process of FIG. 4B.

FIGS. 4A-4C illustrate a flow diagram for one embodiment of a process for deep clickflow tracking. The process is performed by processing logic that may comprise hardware (circuitry, dedicated logic, etc.), software (such as is run on a general purpose computer system or a dedicated machine), or a combination of both.

The process begins, in FIG. 4A, when processing logic receives a link for web content that resolves at the customer's web server (processing block 402). In one embodiment, the customer's web server is a web server maintained by a third party on behalf of the customer. In another embodiment, the customer has actual control and/or possession of the web server. Note that the process is applied when the received URL link is a link that resolves at the customer's web server, and not an arbitrary third party server. This condition preserves the rights of third parties from being intruded upon, as well as possible interference with third party copyright protections.

The received link is then modified by processing logic to an initial modified link form (processing block 404). Because the initial modified form of the link may be difficult to remember or appear unrelated to the initial customer supplied link, processing logic modifies the initial modified link form to a final link form (processing block 406). In one embodiment the final modified form may allow for recording tracking information relevant to individuals, groups, specific activities, targeted advertisement campaigns, etc.

Processing logic then transmits the invitation link to the customer (processing block 408). The process then proceeds to FIG. 4B upon receiving an indication that a user is using a modified link to access web content.

Processing logic then receives a web content request from a user, the request corresponding to modified link (processing block 412). Upon detecting that a modified link has been traversed, processing logic records data to a database indicative of the user's present interaction with the requested web content (processing block 414). In one embodiment, the data includes any of the URL requested, time spent on page, time spent on site, presence on site, sequence of pages requested, etc. Further, the database may consist of a single database or a collection of databases. In either case, the data recorded to the database is corresponds with the invitation link.

Processing logic then requests web content from the web server consistent with the selected link (processing block 416). In one embodiment all relevant user header information, received from the user agent during processing block 412, is forwarded to the web server which supplies the web content so that the request for content appears as if it is a request directly from the user. Further, by forwarding the relevant header information, processing logic can ensure that the look and the functionality of the web content are preserved so that the user has a good experience. In another embodiment, processing logic first decrypts a secure user request utilizing the user's SSL certificate before re-encrypting the request with the rewriter server's SSL certificate.

Because not all content for the requested web page may be located on a single web server, such as a customer web server, processing logic further requests additional content not located on the web server (processing block 418).

Processing logic then modifies links within the received web content, and other content, to a final form of a link for deep clickflow tracking (processing block 420). As discussed above, the final modified form of the URL link can be modified according to various schemes, to various levels of modification, to the needs of a customer, etc. In one embodiment, the modified link is a Genius URL.

The process then proceeds to FIG. 4C.

Processing logic then determines whether or not to dynamically inject additional content into the received web content (processing block 422). In one embodiment, processing logic dynamically inserts additional content on the customer's behalf and with the customer's permission. In another embodiment, processing logic can utilize parameters to determine whether and what kind of dynamic content to insert in web content. In yet another embodiment, processing logic will dynamically inject additional content when data indicative of a user's past and/or present browsing behavior satisfies a predetermined condition with respect to a current page request.

If processing logic determines additional content will not be dynamically injected into the modified customer content, processing logic proceeds to processing block 426. However, if processing logic determines additional content is to be dynamically injected, processing logic proceeds to processing block 424.

In one embodiment, processing logic injects one or more of coupons, dynamic help, customer annotations, watermarks, on-page chat, JavaScript for user interface recording, etc. (processing block 424). In one embodiment, the dynamically injected content is injected in the form of an HTML <div> Tag floating on top of the existing content. Depending on the preferences and instructions of a customer, the <div> Tags can be injected unobtrusively, extremely visible, or at some intermediate level of visibility.

After processing logic has received all necessary web content, modified all links, and injected content when appropriate, processing logic supplies the modified content to the user (processing block 426). As noted above, the content will both look and act as if it were served directly from the original web server. Further, processing logic will attempt to deposit a cookie, if possible, with the user (processing block 428) so that processing logic can identify a user when the user requests content via a non-modified link, such as through a banner advertisement.

Processing logic then receives an additional request for web content from the user (processing block 430). Upon receiving the additional request, processing logic returns to processing block 412 of FIG. 4B so that processing logic can continue deep clickflow tracking.

Figure 5:
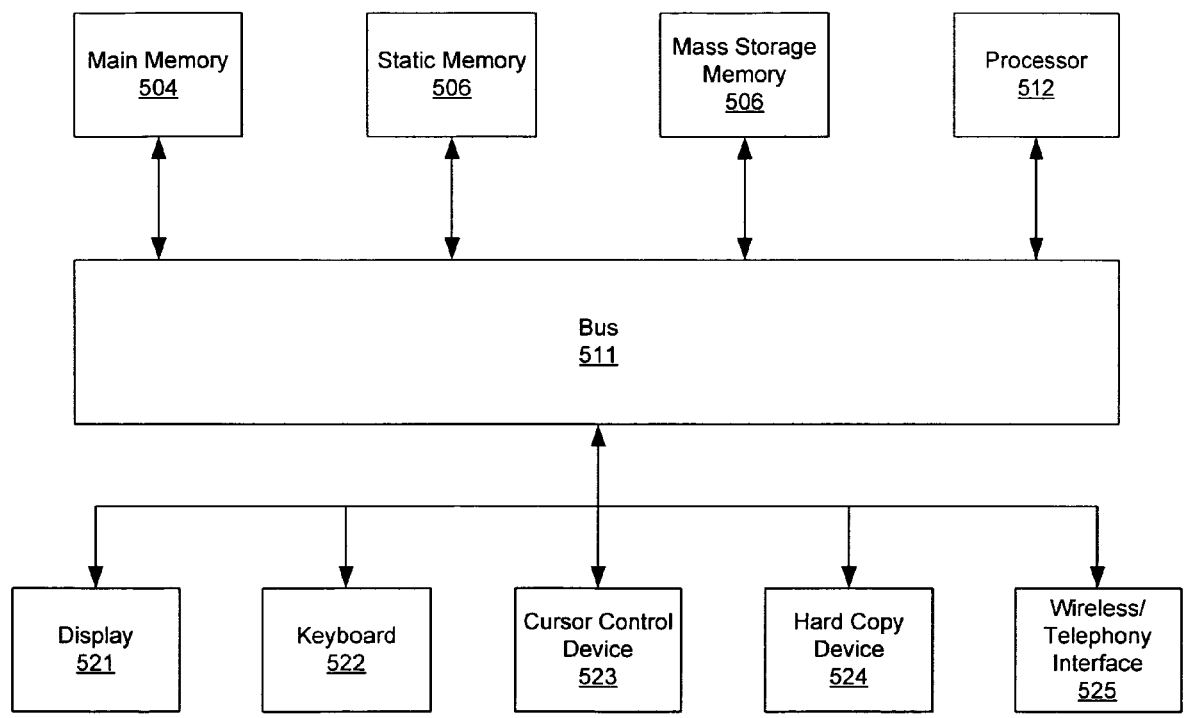
FIG. 5 is a block diagram of an exemplary computer system.

FIG. 5 is a block diagram of an exemplary computer system that may perform one or more of the operations described herein. Referring to FIG. 5, computer system 500 may comprise an exemplary client or server computer system. Computer system 500 comprises a communication mechanism or bus 511 for communicating information, and a processor 512 coupled with bus 511 for processing information. Processor 512 includes a microprocessor, but is not limited to a microprocessor, such as, for example, Pentium™, PowerPC™, Alpha™, etc.

System 500 further comprises a random access memory (RAM), or other dynamic storage device 504 (referred to as main memory) coupled to bus 511 for storing information and instructions to be executed by processor 512. Main memory 504 also may be used for storing temporary variables or other intermediate information during execution of instructions by processor 512.

Computer system 500 also comprises a read only memory (ROM) and/or other static storage device 506 coupled to bus 511 for storing static information and instructions for processor 512, and a data storage device 507, such as a magnetic disk or optical disk and its corresponding disk drive. Data storage device 507 is coupled to bus 511 for storing information and instructions.

Computer system 500 may further be coupled to a display device 521, such as a cathode ray tube (CRT) or liquid crystal display (LCD), coupled to bus 511 for displaying information to a computer user. An alphanumeric input device 522, including alphanumeric and other keys, may also be coupled to bus 511 for communicating information and command selections to processor 512. An additional user input device is cursor control 523, such as a mouse, trackball, trackpad, stylus, or cursor direction keys, coupled to bus 511 for communicating direction information and command selections to processor 512, and for controlling cursor movement on display 521.

Another device that may be coupled to bus 511 is hard copy device 524, which may be used for marking information on a medium such as paper, film, or similar types of media. Another device that may be coupled to bus 511 is a wired/wireless communication capability 525 to communication to a phone or handheld palm device.

Note that any or all of the components of system 500 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for obtaining information from web site use, comprising:

tracking, at a first server, interactions of a user with web content when the user uses a modified link to enter a website, the modified link in a format that resembles a website address for the website served from a second server, but to resolve at the first server through which the interactions can be tracked;

storing data indicative of the tracked interactions in a database;

and determining additional content to inject into requested web content based on the tracked interactions of the user;

and in response to the user using the modified link to request web content, obtaining the requested web content from at least the second server and supplying modified web content from the first server, the modified web content modified from the obtained web content so that one or more links in the obtained web content are replaced with one or more modified links, corresponding to the one or more links, that resemble links to the web content served from the second server but to resolve at the first server through which the interactions can be tracked, the modified web content further modified by dynamically injecting the additional content from the second database into the modified web content prior to the supplying;

wherein the supplying further comprises:

in response to the user using one of the one or more modified links, a rewriting server obtain web content corresponding to the one or more links being used by the user;

rewriting one or more links within the obtained web content to resolve at the first server through which the interactions can be tracked, to created modified web content;

and sending the modified web content to the user, the modified web content appearing like a non-modified version of the web content;

determining whether each of a plurality of links in the requested web content is to resolve at the second server or to resolve at a non-consenting third party server;

and rewriting only those links in the obtained web content that are to resolve at the second server, wherein links to web content from non-consenting third parties are not rewritten to resolve at the first server through which the interactions can be tracked.

2. The method of claim 1, further comprising:

receiving an original link to the website, the original link to resolve at the second server through which unmodified web content is served; and supplying the modified link.

3. The method of claim 1, wherein the one or more links are one or more Universal Resource Locator (URL) links, hypertext markup language (HTML) links, links within embedded JavaScript, links embedded in Macromedia Flash content, Portable Document Format (PDF) files, cookies, Secure Socket Layer (SSL) links, Absolute links.

4. The method of claim 1, wherein the storing further comprises: receiving an indication of a user selection of a modified link within the modified web content; and recording data to the database, the data indicative of the tracked interactions of the user with the modified web content.

5. The method of claim 4, wherein the data includes one or more of: a requested link, a requested modified link, data indicative of a customer that supplied a link, duration of user traversing the modified web content, a sequence of modified link selection, the user presence on a web site associated with the web content, information about the user.

6. The method of claim 1, wherein the dynamically injected additional content includes one or more of a coupon, help content, a watermark, on-page chat, a recording, a survey, a script.

7. The method of claim 1, further comprising:

depositing a cookie in a memory of a computer being used by the user to identify the user upon a subsequent request for the web content via a non-modified link.

8. The method of claim 1, wherein the tracking further comprises:

receiving a request at the first server for web content from a web browser being used by the user;

forwarding header information, relevant to the web browser type being used by the user, to the second server which serves the web content;

receiving web content from the second server which serves the web content, the web content corresponding to the relevant web browser type information; and supplying, from the first server to the user, modified web content corresponding to the relevant web browser type information.

9. The method of claim 8, further comprising:
- securing communication between the user and the first server through which the interactions can be tracked with a first Secure Socket Layer (SSL) certificate of the first server through which the interactions can be tracked; and
- securing communication between the first server through which the interactions can be tracked and the second server through which the web content is served with a second Secure Socket Layer (SSL) certificate of the second server through which the web content is served.

10. A system, comprising:
- a database;
- and a server, wherein the server is to:
- track interactions of a user with web content when the user uses a modified link to enter a website, the modified link in a format that resembles a website address for the website served from a second server, but to resolve at a the server through which the server can track the interactions;
- store data indicative of the tracked interactions in the database;
- and determine additional content to inject into requested web content based on the tracked interactions of the user;
- and obtain web content from the second server and supply modified web content from the server in response to selection of a modified link, the modified web content modified from the obtained web content so that one or more links in the obtained web content are replaced with one or more modified links, corresponding to the one or more links, that resemble links to the web content served from the second server but to resolve at the server through which the interactions can be tracked, the modified web content further modified to include dynamically injected additional content from the second database into the modified web content prior to being supplied;
- wherein the supplied content further comprises:
- in response to the user using one of the one or more modified links, a rewriting server obtaining web content corresponding to the one or more links being used by the user;
- rewriting one or more links within the obtained web content to resolve at the first server through which the interactions can be tracked, to created modified web content;
- and sending the modified web content to the user, the modified web content appearing like a non-modified version of the web content;
- determining whether each of a plurality of links in the requested web content is to resolve at the second server or to resolve at a non-consenting third party server;
- and rewriting only those links in the obtained web content that are to resolve at the second server, wherein links to web content from non-consenting third parties are not rewritten to resolve at the first server through which the interactions can be tracked.

11. The system of claim 10, further comprises: the server to:
- receive an original link to the website, the original link to resolve at the second server through which unmodified web content is served; and
- supply the modified link.

12. The system of claim 10, wherein the one or more links are one or more Universal Resource Locator (URL) links, hypertext markup language (HTML) links, links within embedded JavaScript, links embedded in Macromedia Flash content, Portable Document Format (PDF) files, cookies, Secure Socket Layer (SSL) links.

13. The system of claim 10,
- wherein the dynamically injected additional content includes one or more of a coupon, help content, a watermark, on-page chat, a recording, a survey, a script.

14. The system of claim 10, further comprises: the server to:
- deposit a cookie in a memory of a computer being used by the user to identify the user upon a subsequent request for the web content via a non-modified link.

15. The system of claim 10, further comprises: the server to:
- receive a request at the server for web content from a web browser being used by the user;
- forward header information, relevant to the web browser type being used by the user, to the second server which serves the web content;
- receive web content from the second server which serves the web content, the web content corresponding to the relevant web browser type information; and
- supply, from the server to the user, modified web content corresponding to the relevant web browser type information.

16. The system of claim 10, further comprises: the server to:
- secure communication between the user and the server through which the interactions can be tracked with a first Secure Socket Layer (SSL) certificate of the server through which the interactions can be tracked; and
- secure communication between the server through which the interactions can be tracked and the second server through which the web content is served with a second Secure Socket Layer (SSL) certificate of the second server through which the web content is served.

17. A computer-readable storage medium having instructions stored thereon, which when executed by a machine, causes the machine to perform the operations comprising:
- tracking, at a first server, interactions of a user with web content when the user uses a modified link to enter a website, the modified link in a format that resembles a website address for the website served from a second server, but to resolve at the first server through which the interactions can be tracked;
- storing data indicative of the tracked interactions in a database;
- any determining additional content to inject into requested web content based on the tracked interactions of the user;
- and in response to the user using the modified link to request web content, obtaining the requested web content from at least the second server and supplying modified web content from the first server, the modified web content modified from the obtained web content so that one or more links in the obtained web content are replaced with one or more modified links, corresponding to the one or more links, that resemble links to the web content served from the second server but to resolve at the first server through which the interactions can be tracked, the modified web content further modified by dynamically injecting the additional content from the second database into the modified web content prior to the supplying;

wherein the supplying further comprises:
  in response to the user using one of the one or more modified links, a rewriting server obtaining web content corresponding to the one or more links being used by the user;
  rewriting one or more links within the obtained web content to resolve at the first server through which the interactions can be tracked, to created modified web content;
  and sending the modified web content to the user, the modified web content appearing like a non-modified version of the web content;
  determining whether each of a plurality of links in the requested web content is to resolve at the second server or to resolve at a non-consenting third party server;
  and rewriting only those links in the obtained web content that are to resolve at the second server, wherein links to web content from non-consenting third parties are not rewritten to resolve at the first server through which the interactions can be tracked.

18. The computer-readable storage medium claim 17, further comprising:
  receiving an original link to the website, the original link to resolve at the second server through which unmodified web content is served; and
  supplying the modified link.

19. The computer-readable storage medium of claim 17, wherein the one or more links are one or more Universal Resource Locator (URL) links, hypertext markup language (HTML) links, links within embedded JavaScript, links embedded in Macromedia Flash content, Portable Document Format (PDF) files, cookies, Secure Socket Layer (SSL) links, Absolute links.

20. The computer-readable storage medium of claim 17, wherein the supplying further comprises:
  in response to the user using one of the one or more modified links, a rewriting server obtaining web content corresponding to the one or more links being used by the user;
  rewriting one or more links within the obtained web content to resolve at the first server through which the interactions can be tracked, to created modified web content; and
  sending the modified web content to the user, the modified web content appearing like a non-modified version of the web content.

21. The computer-readable storage medium of claim 20, wherein links to web content from non-consenting third parties are not rewritten to resolve at the first server through which the interactions can be tracked.

22. The computer-readable storage medium of claim 20, wherein the storing further comprises:
  receiving an indication of a user selection of a modified link within the modified web content; and
  recording data to the database, the data indicative of the tracked interactions of the user with the modified web content.

23. The computer-readable storage medium of claim 22, wherein the data includes one or more of: a requested link, a requested modified link, data indicative of a customer that supplied a link, duration of user traversing the modified web content, a sequence of modified link selection, the user presence on a web site associated with the web content, information about the user.

24. The computer-readable storage medium of claim 17, wherein the dynamically injected additional content includes one or more of a coupon, help content, a watermark, on-page chat, a recording, a survey, a script.

25. The computer-readable storage medium of claim 17, further comprising:
  depositing a cookie in a memory of a computer being used by the user to identify the user upon a subsequent request for the web content via a non-modified link.

26. The computer-readable storage medium of claim 17, wherein the tracking further comprises:
  receiving a request, at the first server, for web content from a web browser being used by the user;
  forwarding header information, relevant to the web browser type being used by the user, to a location which serves the web content;
  receiving web content from the second server which serves the web content, the web content corresponding to the relevant web browser type information; and
  supplying, from the first server to the user, modified web content corresponding to the relevant web browser type information.

27. The computer-readable storage medium of claim 26, further comprising:
  securing communication between the user and the first server through which the interactions can be tracked server with a first Secure Socket Layer (SSL) certificate of the first server through which the interactions can be tracked; and
  securing communication between the first server through which the interactions can be tracked and the second server through which the web content is served with a second Secure Socket Layer (SSL) certificate of the second server through which the web content is served.

* * * * *